US012543882B2

(12) United States Patent
Lenkeit

(10) Patent No.: US 12,543,882 B2
(45) Date of Patent: Feb. 10, 2026

(54) PREPARATION VESSEL FOR A KITCHEN DEVICE

(71) Applicant: Vorwerk & Co. Interholding GmbH, Wuppertal (DE)

(72) Inventor: Nadine Lenkeit, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 889 days.

(21) Appl. No.: 17/828,078

(22) Filed: May 31, 2022

(65) Prior Publication Data

US 2022/0378239 A1 Dec. 1, 2022

(30) Foreign Application Priority Data

May 31, 2021 (DE) .................... 10 2021 114 057.9

(51) Int. Cl.
| | |
|---|---|
| A47J 19/02 | (2006.01) |
| A47J 19/06 | (2006.01) |
| B30B 9/20 | (2006.01) |
| B30B 9/26 | (2006.01) |
| B30B 15/14 | (2006.01) |
| G06K 7/10 | (2006.01) |

(52) U.S. Cl.
CPC ............ *A47J 19/027* (2013.01); *A47J 19/06* (2013.01); *B30B 9/20* (2013.01); *B30B 9/26* (2013.01); *B30B 15/148* (2013.01); *G06K 7/10366* (2013.01)

(58) Field of Classification Search
CPC .......... A47J 19/027; A47J 19/06; A47J 42/04; A47J 42/46; A47J 42/14; A47J 42/40; A47J 42/00; A47J 42/50; A47J 43/046; B30B 9/20; B30B 9/26; B30B 15/148; G06K 7/10366
USPC ... 99/326–335, 348, 468, 486, 492, 509–511
See application file for complete search history.

(56) References Cited

U.S. PATENT DOCUMENTS

| | | | |
|---|---|---|---|
| 3,924,838 A * | 12/1975 | Waniishi ................. | A47J 43/06 366/205 |
| 5,405,096 A | 4/1995 | Seol | |
| 2012/0048127 A1 | 3/2012 | Huang et al. | |
| 2018/0008097 A1* | 1/2018 | Mehlman .............. | A47J 43/042 |
| 2019/0117013 A1* | 4/2019 | Kim ...................... | A47J 43/075 |

FOREIGN PATENT DOCUMENTS

| | | |
|---|---|---|
| AT | 520201 A4 | 2/2019 |
| CN | 105496170 A | 4/2016 |
| DE | 102009006672 A1 | 8/2010 |
| DE | 202020106270 U1 | 12/2020 |
| EP | 3222173 A1 | 9/2017 |

* cited by examiner

*Primary Examiner* — Phuong T Nguyen
(74) *Attorney, Agent, or Firm* — Dickinson Wright PLLC

(57) ABSTRACT

A juicer insert for inserting into a preparation vessel, which juicer insert includes at least one rotatable tool holder, including at least one adapter element and at least one juicer tool. The transmission of rotational force the adapter element is configured at least indirectly couplable with the tool holder. The juicer tool is connected to the adapter element, so that a rotation of the adapter element causes a rotation of the juicer tool.

18 Claims, 3 Drawing Sheets

PREPARATION VESSEL FOR A KITCHEN DEVICE

CROSS REFERENCE TO RELATED APPLICATIONS

This application claims the benefit of priority under 35 U.S.C. § 119 to German Patent Application No.: 10 2021 114 057.9, filed May 31, 2021, the contents of which is incorporated herein by reference in its entirety.

FIELD

The invention relates to a juicer insert for inserting into a preparation vessel that includes at least one rotatable tool holder.

BACKGROUND

The statements in this section merely provide background information related to the present disclosure and several definitions for terms used in the present disclosure and may not constitute prior art.

For many people healthy nutrition is a central component in their daily routine. A variety of aids are available for producing juices and smoothies, the use of which aids foodstuff, such as fruits and vegetables, to be juiced. For this purpose manual tools are usually used, such as, for example, juicing cones for citrus fruits, or manual grater, for example for apples or vegetables. Furthermore, a variety of electrically driven juicing devices are known that crush or squash the foodstuff and substantially separate the obtained liquid from the solid components of the foodstuff.

However, the aids or devices that are available have the disadvantage that either an enormous physical effort and time requirement must be applied by the user, or—in the case of electric juicers—a device usable only for the purpose of juicing must be stored.

Therefore, an object of the present disclosure is to specify an aid for the juicing of foodstuffs, the usage of which reduces the physical effort for the user, and simultaneously an additional device can be omitted.

SUMMARY

The objective of the present disclosure is achieved by a juicer insert for inserting into a preparation vessel that includes at least one rotatable tool holder, including at least one adapter element and at least one juicer tool. The transmission of rotational force the adapter element is configured at least indirectly couplable with the tool holder. The juicer tool is connected to the adapter element, so that a rotation of the adapter element causes a rotation of the juicer tool.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
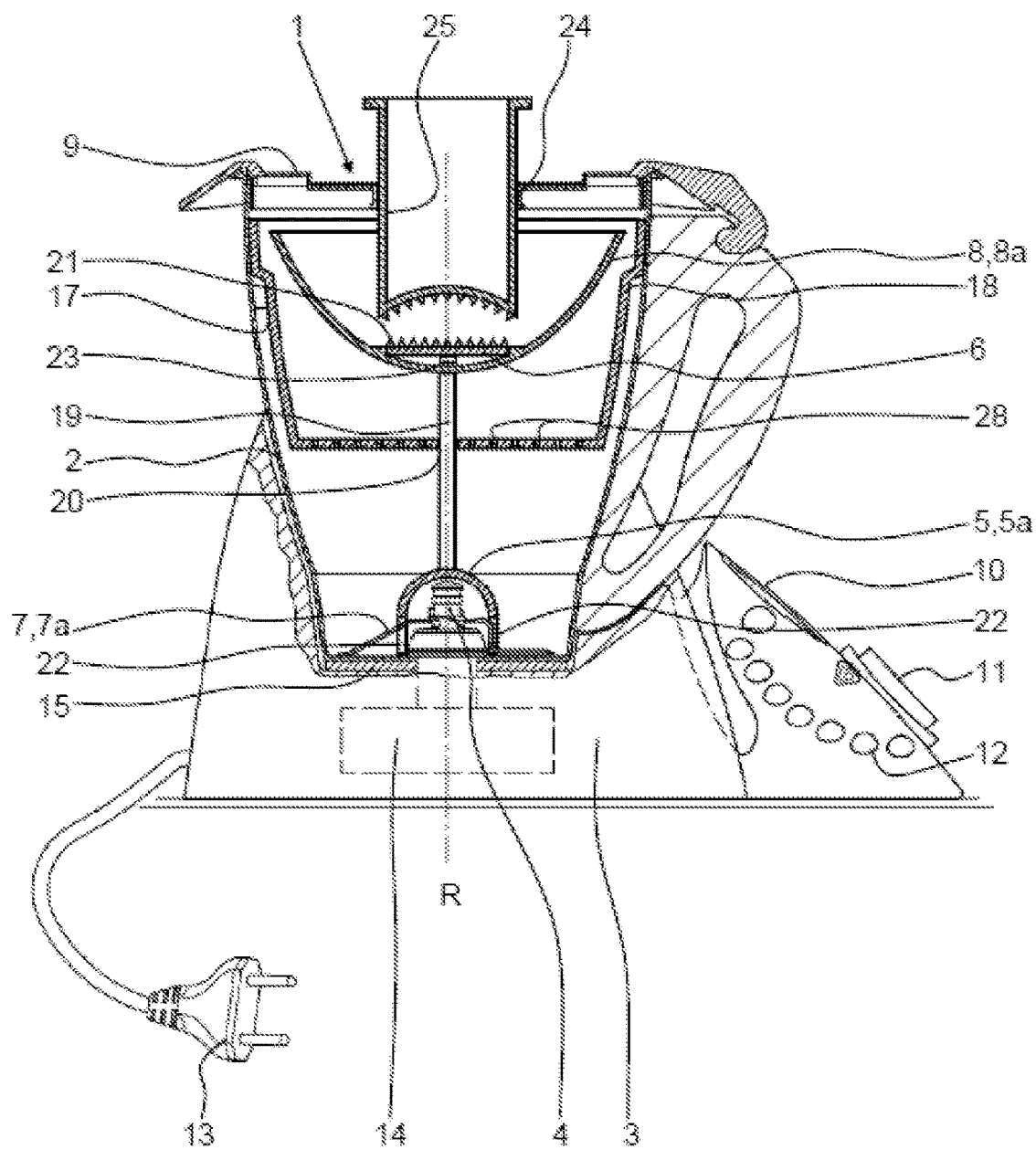
FIG. 1 shows a cross-sectional view of a juicer insert in a preparation vessel according to the teachings of the present disclosure.

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The juicer insert for inserting into a preparation vessel of the present disclosure generally includes at least one rotatable tool holder, including at least one adapter element and at least one juicer tool; wherein for the transmission of rotational force the adapter element is configured at least indirectly couplable with the tool holder; wherein the juicer tool is connected to the adapter element, so that a rotation of the adapter element causes a rotation of the juicer tool.

In a variety of households, kitchen devices are already in use that include a preparation vessel including at least one rotatable tool holder. For example, there are kitchen devices that are configured for the preparing of foodstuffs. The preparation vessel has a volume into which the prepared foods are introduced. The rotatable tool holder or the tool attached to the rotatable tool holder is usually disposed at the base of the preparation vessel. In the state of the preparation vessel inserted into the kitchen device, the tool holder is rotatably drivable by a motor of the kitchen device, in particular having variable rotational speeds.

The tool holder includes, for example, a shaft traversing the preparation vessel. In particular, outside the preparation vessel the shaft is at least indirectly couplable, preferably in an interference-fit manner, to a motor of a kitchen device. It is advantageously provided that a tool is fixedly or releasably connected to the tool holder or the shaft. Alternatively thereto it is also provided that the tool holder is magnetically rotatably couplable to a motor.

The preparation vessel is configured, for example, with a tool attached to the tool holder, which tool is for stirring and/or crushing of foodstuffs. Furthermore, it is provided in particular that the preparation vessel includes at least one heating device, using which foodstuffs introducible into the preparation vessel are heatable. For this purpose the preparation vessel includes at least one electrical interface to the kitchen device. Such a kitchen device including preparation vessel is distributed by Vorwerk SE & Co. KG, Germany, for example, under the trade name Thermomix®.

According to one aspect of the present disclosure, it is provided that the preparation vessel includes at least one cooling device. The cooling device preferably includes at least one Peltier element.

The juicer insert includes at least one adapter element and at least one juicer tool. The juicer insert is configured such that it is at least partially, preferably fully, introducible into the preparation vessel, in particular into the volume provided for the foodstuff. The adapter element of the juicer is arranged and configured such that it is at least indirectly couplable to the tool holder for the transmission of rotational force. The adapter element can therefore at least be indirectly coupled to the rotatable tool holder present in the preparation vessel, so that during a rotation of the tool holder, the adapter element also rotates.

The juicer insert is preferably introducible into the preparation vessel, in particular into the volume provided for foodstuffs, such that the preparation vessel is closable by a cover. For this purpose the cover preferably abuts at least partially against an inner wall of the preparation vessel. The juicer insert is in particular accessible through an opening in the cover, preferably such that foodstuffs to be juiced are introducible through the opening. For example, a press tool is routable through the opening. In particular, the preparation vessel is configured to be pressure-resistant for steam-cooking processes. The preparation vessel is preferably closable by the cover in a pressure-resistant manner. In particular, the preparation vessel, preferably at least the inner wall surrounding the volume receiving the food, is configured as a single component.

The adapter element is connected to the juicer tool such that they rotate together, so that a rotation of the adapter element causes a rotation of the juicer tool. For example, a connecting shaft, in particular a rigid connecting shaft, is disposed between the adapter element and the juicer tool.

According to another aspect of the present disclosure, it is provided that a tool is disposed on the tool holder of the preparation vessel. For example, the tool is removably attached, so that it is exchangeable, or it is non-exchangeably connected to the tool holder. It is also provided that the adapter element for the transmission of rotational force is configured at least indirectly or directly couplable to the tool, so that the adapter element engages against the tool present in the preparation vessel such that a rotation of the tool is transmitted to the adapter element and thus to the juicer insert. It is provided that the adapter element for the transmission of rotational force interacts only with the tool holder, or only with the tool, or with the tool and the tool holder.

The adapter element and/or the connecting shaft and/or the juicer tool are manufactured, for example, from a plastic or a metal, in particular a stainless steel. The cleaning is in particular simplified by the adapter element, the connecting shaft, and the juicer tool being detachable from one another, in particular detachable without the use of tools. In particular, at least the juicer tool is exchangeably installed. It is also provided that the adapter element, the connecting shaft, and the juicer tool are non-detachably connected to one another.

Compared to conventional preparation vessels, the preparation vessel of the present disclosure has the advantage that the physical effort for the juicing of foodstuffs is reduced for the user, since the juicer insert is drivable via the rotatable tool holder of the preparation vessel. In addition, no additional device is required for juicing, and the juicer insert can be retrofitted with already existing kitchen devices for inserting into a preparation vessel.

In particular with foodstuffs that must be crushed for juicing, according to one design of the juicer insert it has proved particularly advantageous when it is provided that at least one first separating device is present, and that using the first separating device the juice of the crushed foodstuff, for example, carrots, fennel, or apples, is separable from solid components. The separating device is configured, for example, as a sieve, mesh, or grate, and serves to separate the solid components, up to a certain size, from the juice of the foodstuff. The separating device is preferably disposed such that a separating of solid components, up to a certain particle size, and juice can be effected, for example, below the juicer tool. For example, the juice is collected at the base of the preparation vessel.

According to another aspect of the present disclosure, it is provided that the first separating device extends essentially in a plane toward an inner wall of the preparation vessel. The first separating device is configured, for example, disk-shaped.

The juicer tool rotates during operation such that it has proven as advantageous when the first separating device encloses the juicer tool at least partially, in particular completely. The first separating device is preferably held such that it rotates together with the juicer tool. The first separating device is configured, for example, pot- or cone-shaped, so that the separating device extends upward starting from the juicer tool. The first separating device preferably extends at least sectionally, in particular completely, in a plane with the juicer tool. Due to the centrifugal forces, the components of the foodstuff crushed by the juicer tool are transported outward against the separating device, wherein a separating is effected between juice and solid components up to a certain particle size. The first separating device is preferably at least sectionally disposed essentially orthogonally to a working plane of the juicer tool, so that centrifugal forces can act in an advantageous manner for separating.

In order to prevent that the solid components of the foodstuff separated from the juice inadvertently mix again with the juice, according to a further design of the device, it is preferably provided that the separating device includes at least one partially, in particular completely, circumferentially encircling seal. The seal prevents that the solid components of the foodstuff migrate beyond the edge of the separating device due to the rotation and mix again with the juice in the preparation vessel or at the base of the preparation vessel. The seal preferably has an inclination with respect to a rotational axis of the juicer tool. The seal is preferably designed to be flexible, in particular in order to compensate for gaps of different widths in various preparation vessels. The seal is in particular formed from a material that has a low friction coefficient, for example, polytetrafluoroethylene (PTFE), in particular when the seal rotates together with the juicer tool against an inner wall of the preparation vessel. It is also provided that the seal is manufactured from a different material and includes a coating made of polytetrafluoroethylene (PTFE).

According to another aspect of the present disclosure, it is preferably provided that the first separating device is configured such that in the state in which it is introduced into the preparation vessel, the first separating device abuts against an inner wall of the preparation vessel, in particular abuts by a seal against the inner wall of the preparation vessel. Alternatively thereto it is provided that the first separating device is configured such that in the state in which it is introduced into the preparation vessel, the first separating device is disposed spaced with respect to an inner wall of the preparation vessel.

A further design of the juicer insert provides that at least one second separating device is present. The second separating device preferably includes larger separating openings than the first separating device. For example, the second separating device is configured as a sieve having a greater mesh width than the first separating device. It is also provided that the second separating device includes holes and slots as separating openings. For example, the second separating device is configured pot- or cone-shaped. It is also provided that the second separating device extends essentially in a plane toward an inner wall of the preparation vessel. The second separating device is configured, for example, disk-shaped.

The second separating device is advantageously held spaced along a rotational axis of the juicer tool with respect to the first separating device. In particular, the first separating device and the second separating device are disposed below the juicer tool, in particular between the juicer tool and the adapter element. The first separating device is preferably disposed at least sectionally in a plane with the juicer tool.

The second separating device is consequently disposed closer to the adapter element than the first separating device. Both the first separating device and the second separating device are preferably configured pot-shaped, wherein in particular it is provided that the first separating device extends up to a first height, and that the second separating device is configured such that it also extends up to the first height. In particular, the second separating device partially or completely surrounds the first separating device. With this arrangement of the separating devices, a seal can be omitted.

According to another aspect of the present disclosure it is in particular provided that the second separating device is configured such that in the state in which it is introduced into the preparation vessel, the first separating device abuts against an inner wall of the preparation vessel, preferably abuts by a seal against the inner wall. Alternatively thereto it is also provided that in the state in which it is introduced into the preparation vessel, the second separating device is disposed spaced with respect to an inner wall of the preparation vessel.

The second separating device is rotatably supported on the juicer insert, for example, such that the second separating device is fixedly insertable into the preparation vessel. Here the second separating device additionally serves as supporting of the juicer insert with respect to the preparation vessel. The first separating device is configured such it rotates together with the juicer tool, in particular with the adapter element and/or the juicer tool. If solid components are now carried out outward by the rotation via the first separating device, these components are collected by the second separating device. The juice is again collected at the base of the preparation vessel.

In particular with exemplary embodiments wherein no second separating device is provided, it has proved particularly advantageous when it is provided that an adapter element and the juicer tool are connected to each other by a connecting shaft, in particular that a positioning means for supporting against the wall of the preparation vessel is disposed on the connecting shaft. The positioning means is, for example, rotatably supported on the connecting shaft, and is supported, for example, in particular by a seal, against the wall of the preparation vessel. The juicer tool is held centrally inside the preparation vessel by the positioning means. The positioning means preferably at least includes openings in order to allow the juice to pass through to the base of the preparation vessel.

The connecting shaft connects the adapter element and the juicer tool, in particular such that rotational force is transmissible. Alternatively thereto it is also provided that the adapter element and the juicer tool are directly connected to each other. Here rotational force is transmitted directly; a connecting shaft is then unnecessary.

According to yet another aspect of the present disclosure it is also provided that the adapter element is disposed at least partially or completely in the juicer tool. For example, it is provided that the adapter element is disposed at least partially in a juicer cone, in particular for the juicing of citrus fruits.

According to a further design of the juicer insert it has proved particularly advantageous when it is provided that the juicer tool is exchangeably installed, in particular exchangeably installed without the use of tools. A juicer insert includes, for example, a plurality of associated juicer tools—a set of juicer tools—that are each provided, for example, for different types of vegetables or fruits. Thus, for example, different juicer tools are provided for tomatoes, lemons, carrots, fennel, and other foodstuffs. The juicer tool is screwed, for example, to the separating device or the connecting shaft. It is also provided that the juicer tool is attached by clamping, screwing, or tensioning.

According to one design it has proved particularly advantageous when the juicer tool includes cutting or shredding tools, and/or that the juicer tool has a conical inner surface or a concave inner surface, and that cutting and/or shredding tools are disposed on or in the conical inner surface or the concave inner surface. Furthermore, it is provided that the juicer tool is configured as a juicer cone for citrus fruits.

In the case of the conical inner surface or the concave inner surface, foodstuffs can be pressed-in in a simple manner into the cone of the juicer tool or the concave inner surface, so that the cutting- and/or shredding-tool can crush the foodstuff in a simple manner in order to extract the juice.

A further design of the juicer insert provides that the adapter element is configured for the interference- and/or friction-fit interaction with a tool holder or a tool installed on the tool holder. The adapter element preferably includes a sleeve-shaped base body that includes a plurality of openings extending along a rotational axis. In the assembled state the openings interact in an interference-fit manner with the tool or with the tool holder of the preparation vessel. For example, the tool is configured as a cutting- and stirring-tool including at least two, in particular at least four, wings. In its sleeve-shaped base body, the adapter element includes, for example, four openings, so that the wings of the cutting knife can be overlapped. In particular, the adapter element is configured such that it does not abut against the blade sections of the wings, but rather against blunt retaining sections. The blade sections are thereby not damaged.

For example, in contact regions for the tool holder or for the tool of the preparation vessel, the adapter element includes an elastic coating in order to not damage the tool holder or the tool and to produce an improved interference-fit.

In particular, in order to ensure an advantageous integration into a kitchen-device setting, according to a further design it is provided that the juicer insert and/or the juicer tool includes at least one identification means for identification by a kitchen device. The juicer insert and/or the juicer tool are consequently detected by the preparation vessel during the inserting into the preparation vessel of a kitchen device, so that, for example, an operating mode is determined for the motor and thus for the tool disposed in the preparation vessel. Thus, for example, the rotational speed can be limited to a maximum rotational speed, or with certain juicer tools that are associated with predetermined fruits and vegetables, a rotational speed adapted to the corresponding foodstuffs can be set. The identification means is configured, for example, for the receiving and/or sending of radio signals, in particular of short-range radio signals. For example, the identification means includes at least one RFID chip or similar.

According to another aspect of the present disclosure, the above-mentioned objective is further achieved by a preparation vessel for a kitchen device, which preparation vessel includes at least one rotatable tool holder, preferably a tool attached to the tool holder, and at least one juicer insert, introducible into the preparation vessel, according to one of the above-described exemplary embodiments.

According to one design of the preparation vessel, it is provided that at least one cover and at least one press tool are included. The cover prevents that juice and/or solid components of crushed foodstuffs escape from the preparation vessel. The press tool serves to press the to-be-crushed foodstuffs against the juicer tool. The cover preferably includes at least one opening. The press tool is preferably dimensioned such that it is introducible through the opening in the cover into the preparation vessel in order to apply a pressing force onto a foodstuff in cooperation with the juicer tool.

Alternatively it is provided for this purpose that the cover includes an at least partially pivotable section, and that the press tool is disposed at least partially on the pivotable part of the cover. Here the press tool also serves for the applying of a pressing force onto a foodstuff in cooperation with the juicer tool, but it is thereby achieved by the juicer tool that a part of the cover is folded upward. In the folded-upward state a foodstuff is introducible, and by folding downward the cover can effect a press force on the foodstuff.

The above-mentioned objective is further achieved by a kitchen device for the preparation of meals, as described above. The kitchen device includes at least one preparation vessel as described above, as well as at least one juicer insert according to one of the preceding exemplary embodiments. According to a first design, the kitchen device is preferably configured and arranged such that a predetermined rotational speed, in particular a maximum rotational speed, of a motor is determinable for driving the tool holder in a manner dependent on the type of the juicer tool used. The kitchen device includes, for example, a control device, using which the rotational speed of the motor is controllable. The determining of the rotational speed is effected either by selection by the user via an input interface, or automatically by the kitchen device identifying the juicer insert and/or the juicer tool, for example, based on an identification means, in particular by radio.

Furthermore, it is provided that the rotational speed, in particular the maximum rotational speed, is determinable in a manner dependent on control commands of a preparation program running on the kitchen device, in particular the control device of the kitchen device. The kitchen device is controllable, for example, using a preparation program for the preparation of a meal based on a defined recipe. Here the kitchen device informs the user regarding the next steps to be carried out for the preparation. In the present case the user could be asked to use the juicer insert with a certain juicer tool. If the kitchen device detects the inserting or if the inserting is confirmed by the user, a driving of the motor is effected with a predetermined rotational speed that is determined by the control commands of the preparation program in a manner depending on the recipe.

The automatic identification is effected, for example, via an identification means that is disposed on the juicer tool and/or on the juicer insert, and is read by the kitchen device, in particular by radio.

For this purpose the kitchen device preferably includes at least one transmission- and/or reception-means for radio signals of an identification means, in particular of a wireless identification means. For example, the transmission- and/or reception-means is configured for the reading of RFID chips or RFID antennas.

For the subsequent description it is stressed that the present disclosure is not limited to the exemplary embodiments and here not to all or a plurality of features of described feature combinations, but rather each individual partial feature of the/each exemplary embodiment is also of significance for the subject matter of the invention independently from all other partial features described in this connection and also in combination with any other features of another exemplary embodiment.

FIG. 1 shows an exemplary embodiment of a juicer insert 1, inserted into a preparation vessel 2 of a kitchen device 3 including a rotatable tool holder 4. In this exemplary embodiment the juicer insert 1 includes an adapter element 5 and a juicer tool 6. For the transmission of rotational force the adapter element 5 is indirectly coupled with the tool holder 4, by the adapter element 5 interacting in an interference-fit manner with a tool 7 attached to the tool holder 4. In this exemplary embodiment the tool 7 is configured as a cutting- and stirring-tool including four wings 7a. In this exemplary embodiment the juicer tool 6 is configured as a juicer disk 6a.

The juicer insert 1 further includes a first separating device 8 that in this exemplary embodiment is configured as a sieve completely surrounding the juicer tool 6. The first separating device 8 is configured pot-shaped, so that the side walls 8a of the first separating device 8 extend toward a cover 9 of the preparation vessel 2. The cover 9 is connected to the preparation vessel 2 in an interference-fit manner. In alternative designs—not depicted—it is provided that the first separating device 8 is configured as a disk-shaped sieve, or disk having separation openings below the juicer tool 6.

Figure 2:
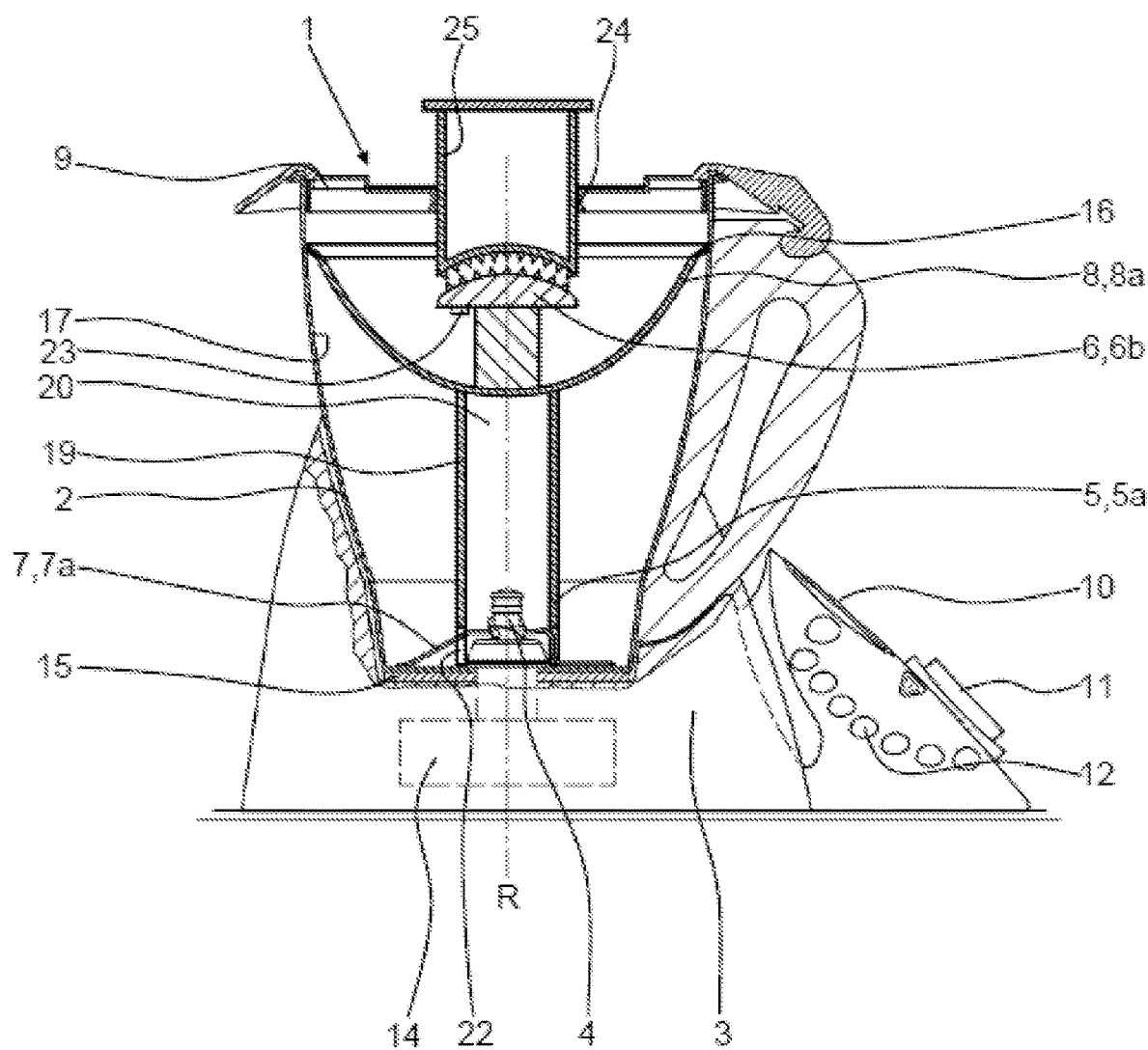
FIG. 2 shows a cross-sectional view of another juicer insert in a preparation vessel according to the teachings of the present disclosure.

FIG. 2 shows a further exemplary embodiment of a juicer insert 1, inserted into a preparation vessel 2 of a kitchen device 3. The preparation vessel 2 in turn includes a rotatable tool holder 4 including a tool 7. In this exemplary embodiment the juicer tool 6 is configured as a juicer cone 6b for citrus fruits. The juicer tool 6 is connected to the adapter element 5 such that they rotate together; the adapter element 5 in turn interacts in an interference-fit manner with the tool 7 attached to the tool holder 4.

The first separating device 8 is in turn configured as a pot-shaped sieve completely surrounding the juicer tool 6. In the upper edge region the first separating device 8 includes a seal 16 disposed over the entire circumference that seals between the first separating device 8 and the inner wall 17 of the preparation vessel 2. The seal 16 is disposed inclined with respect to the rotational axis R. The seal 16 prevents that solid components of the foodstuff to be juiced penetrate into the lower region 2a of the preparation vessel 2 wherein the juice is collected.

According to FIG. 1 and FIG. 2, the kitchen device 3 includes a central display unit 10 including a push- and rotational-button 11 as well as a plurality of operating buttons 12. According to FIG. 1, the kitchen device 3 further includes a mains connection 13 that provides the kitchen device 3 with a voltage. According to FIG. 1 and FIG. 2, the kitchen device 3 further includes a motor 14, using which the tool holder 4 of the preparation vessel 2 is drivable. The tool holder 4 and the motor 14 are coupled to each other below the preparation vessel 2 in an interference-fit manner—not depicted. The preparation vessel 2 further includes an electrical heating device 15 that is also supplied with a voltage and controlled via the kitchen device 3. For this purpose at least one electrical interface—not depicted—is provided between the kitchen device 3 and preparation vessel 2.

In the exemplary embodiment of FIG. 1, a second separating device 18 is disposed along a rotational axis R of the juicer tool 1 spaced with respect to the first separating device 8. The second separating device 18 is disposed approximately at half the extension of a connecting shaft 19 disposed between the adapter element 5 and the first separating device 8. According to FIG. 1, the connecting shaft 19 is configured as a shaft that centrally traverses the second separating device 18. In the upper region of the preparation vessel 2, the second separating device 18 abuts against the inner surface 17 of the preparation vessel 2, and is configured as a grate including holes 28 and slots. It is also provided that the second separating device 18 is held completely spaced with respect to the inner surface 17 of the preparation vessel 2.

In alternative designs—not depicted—it is provided that the second separating device 18 is configured as a disk-shaped sieve, or disk including holes 28 and/or slots, and is disposed below the juicer tool 6.

The connecting shaft 19 can rotate relative to the second separating device 18, but is stabilized by it in its central position inside the preparation vessel 2. For this purpose the connecting shaft 19 is guided through an opening 20 in the second separating device 18. The second separating device 18 thus fulfills the object of a positioning means for supporting against an inner surface 17 of the preparation vessel 2, in order to stabilize the juicer insert 1.

In alternative exemplary embodiments—not depicted—it is provided that a connecting shaft 19 is omitted. The juicer tool 6 is then directly connected to the adapter element 5.

According to the exemplary embodiment of FIG. 1, both the first separating device 8 and the second separating device 18 are configured pot-shaped. Here the second separating device 18 is disposed and configured such that it extends somewhat higher than the first separating device 8 in the preparation vessel 2. Solid components of the to-be-crushed foodstuff that migrate out beyond the upper edge of the first separating device are subsequently held back by the second separating device 18, and can be removed with it from the preparation vessel 2 after the juicing process. The juice remains in the lower region 2*a* of the preparation vessel 2.

Figure 3:
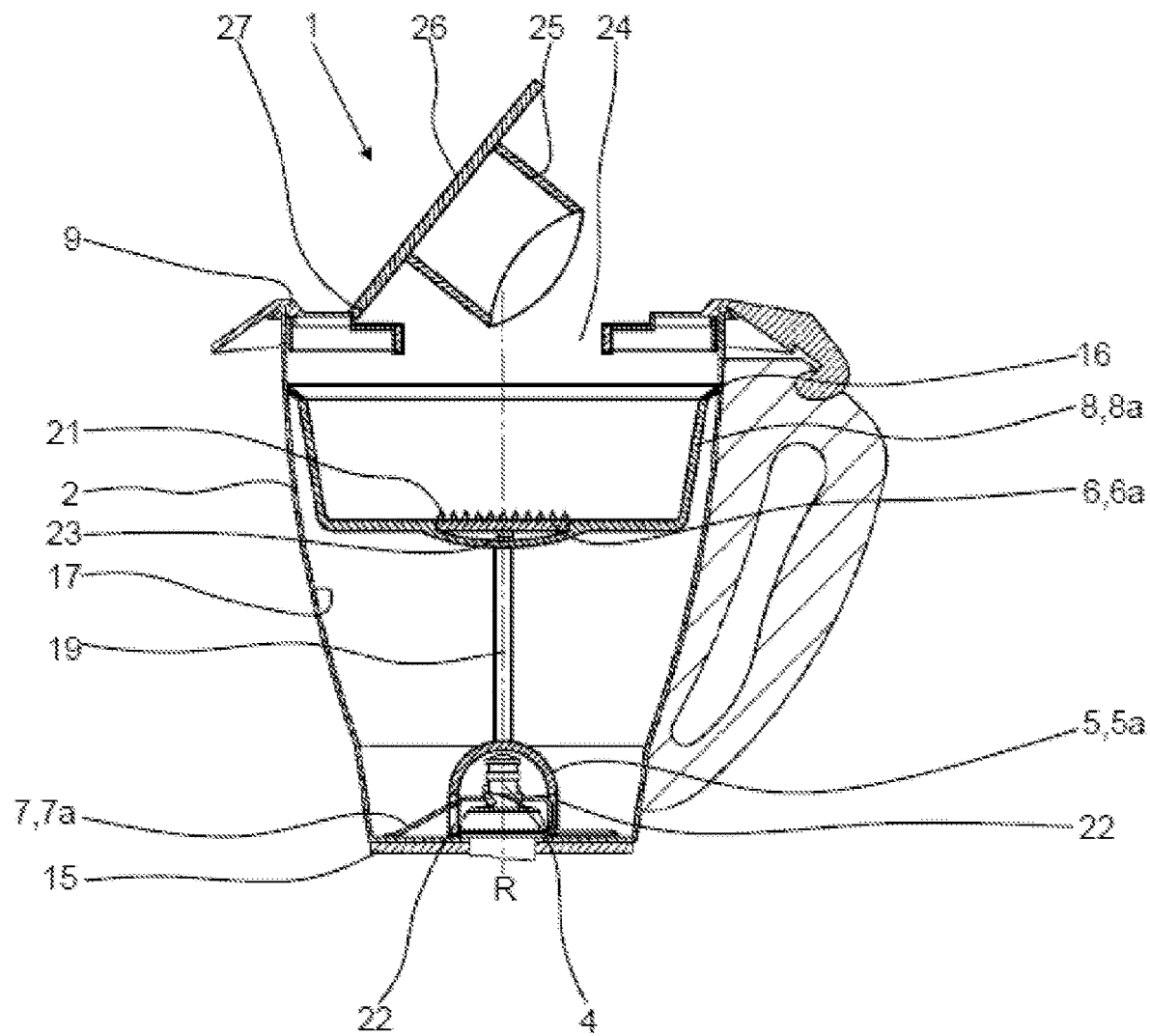
FIG. 3 shows a cross-sectional view of another juicer insert in a preparation vessel according to the teachings of the present disclosure.

The exemplary embodiment of FIG. 3 shows a further exemplary embodiment of a juicer insert 1 in a preparation vessel 2. The juicer insert 1 is configured essentially according to the exemplary embodiment of FIG. 1, but the second separating device 18 is omitted, for which purpose a seal 16 is disposed. In the exemplary embodiment of FIG. 3, the cover 9 includes a pivotable section 26 on which the press tool 25 is disposed. In this exemplary embodiment the section 26 and the press tool 25 are configured as a single component and supported on the cover 9 via a hinge 27. By folding-open of the section 26, a foodstuff can be placed on the juicer tool 6, and subsequently a pressing force can be effected on the foodstuff by folding-back of the section 26, so that the foodstuff is crushed by the juicer tool 6 and juiced.

According to FIG. 1 and FIG. 3, the juicer tool 6 is configured as a juicer disk 6*a* including a cutting- and/or shredding-tool 21 that are suitable for the crushing of hard foodstuffs, for example, carrots or fennel. The cutting- and/or shredding-tool 21 are configured, for example, as curved cutting projections made of the material of the juicer tool 6. According to FIG. 3, the first separating device 8 is disposed at least sectionally in a plane including the juicer tool 6.

According to the exemplary embodiments of FIG. 1, FIG. 2, and FIG. 3, the adapter element 5 includes a sleeve-shaped base body 5*a* as well as a plurality of openings 22 extending along the rotational axis R. The openings 22 are disposed such that they grasp the wings 7*a* of the tool 7 in an interference-fit manner, and that a force transmission is effected from the tool 7 onto the adapter element 5 such that no damage occurs to the blade sections present on the wings 7*a*.

According to FIG. 2, the adapter element 5 merges into the connecting shaft 19 as a single component. The adapter element 5 and connecting shaft 19 have the same diameter.

According to FIG. 1, FIG. 2, and FIG. 3, the respective juicer tool 6 includes an identification means 23 that is configured as an RFID chip in these exemplary embodiments. The kitchen device 3 is configured to read this RFID chip and to limit the rotational speed of the motor 14 based on the type of the juicer tool 6, or to modify other operating states such that they are adapted to the juicer tool 6.

According to the exemplary embodiments of FIG. 1 and FIG. 2, the cover 9 of the preparation vessel 2 includes a centrally disposed opening 24, through which a suitable press tool 25 is introducible, in order to exert a pressing force on a—not depicted—foodstuff, in order to press it against the juicer tool 6 for the purpose of juicing. According to FIGS. 1 and 2, the press tool 25 is configured as an essentially cylindrical press plate.

The invention is not limited to the exemplary embodiments shown and described, but rather also comprises all embodiments which work the same way in the sense of the invention. It is emphasized that the exemplary embodiments are not limited to all features in combination, rather each individual partial feature can also have inventive significance in isolation from all other partial features. Furthermore, the invention is so far not yet limited to the combinations of features defined in any specific embodiment, but rather can also be defined by any other combination of specific features of all of the individual features disclosed herein. This means that in principle practically any individual feature of claim 1 can be removed or replaced by another individual feature disclosed elsewhere in the application. In other words, within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A preparation vessel for a kitchen device, the preparation vessel comprising at least one rotatable tool holder and a juicer insert including at least one adapter element and at least one juicer tool,
wherein for the transmission of rotational force the adapter element is configured at least indirectly couplable with the tool holder,
wherein the juicer tool is connected to the adapter element, so that a rotation of the adapter element causes a rotation of the juicer tool,
wherein the juicer insert is configured to be fully introduced into the preparation vessel,
wherein the preparation vessel has at least one heating device configured to heat foodstuffs that are inserted into the preparation vessel,
wherein the preparation vessel has at least one electrical interface to the kitchen device,
wherein the adapter element includes a sleeve-shaped base body, such that the base body includes openings extending along a rotational axis (R), and that in the assembled state the openings interact in an interference-fit manner with the tool holder of the preparation vessel or with a tool attached to the tool holder.

2. The preparation vessel according to claim 1, wherein at least one cover and at least one press tool are included,
wherein the cover includes at least one opening, and the press tool is configured to be introduced into the preparation vessel, through the opening in the cover, in order to apply a pressing force on the foodstuffs in cooperation with the juicer tool, or the press tool is configured at least partially pivotable as part of the cover in order to apply a pressing force onto the foodstuffs in cooperation with the juicer tool.

3. The kitchen device for the preparation of foodstuffs, the kitchen device comprising at least one preparation vessel according to claim 1.

4. The kitchen device according to claim 3, wherein the kitchen device is configured and arranged such that a predetermined rotational speed for a motor is determinable for driving the tool holder of the preparation vessel in a manner dependent on the type of the juicer tool used, or that a predetermined rotational speed for the motor is determinable for driving the tool holder of the preparation vessel in a manner dependent on the control commands of a preparation program running on the kitchen device.

5. The kitchen device according to claim 4, wherein the motor has a maximum rotational speed which is the same as the predetermined rotational speed.

6. The kitchen device according to claim 3, wherein the kitchen device is configured for transmission or reception of radio signals from an identification element of the juicer insert.

7. The kitchen device according to claim 6, wherein the kitchen device is configured for the reading of RFID chips.

8. The preparation vessel according to claim 1, wherein at least one first separating device is present, the first separating device being configured as a sieve, such that using the first separating device, juice of a to-be-juiced foodstuff is separable from solid components up to a predetermined size.

9. The preparation vessel according to claim 8, wherein the first separating device includes at least one partially, circumferentially encircling seal.

10. The preparation vessel according to claim 8, wherein at least one second separating device is present, the second separating device being held along a rotational axis (R) of the juicer tool spaced with respect to the first separating device.

11. The preparation vessel according to claim 8, wherein the adapter element and the juicer tool are connected to each other by a connecting shaft.

12. The preparation vessel according to claim 8, wherein the juicer tool is exchangeably installed.

13. The preparation vessel according to claim 12, wherein the juicer tool is configured to be exchangeably installed without the use of tools.

14. The preparation vessel according to claim 8, wherein the juicer tool includes cutting- or shredding-tools for the crushing of foodstuffs, or that the juicer tool has a conical inner surface or a concave inner surface, and that cutting- or shredding-tools are disposed on or in the conical surface or the concave inner surface, or that the juicer tool is configured as a juicer cone for citrus fruits.

15. The preparation vessel according to claim 8, wherein the adapter element is configured for an interference- or friction-fit interaction with the tool holder or a tool attached to the tool holder.

16. The preparation vessel according to claim 8, wherein the juicer insert or the juicer tool includes at least one identification element configured for identification by the kitchen device.

17. The preparation vessel according to claim 16, wherein the identification element is configured for receiving and/or sending radio signals.

18. The preparation vessel according to claim 16, wherein the identification element is an RFID chip.

* * * * *